US012785115B2

(12) United States Patent
Kim et al.

(10) Patent No.: US 12,785,115 B2
(45) Date of Patent: Nov. 3, 2026

(54) STAINLESS STEEL FOR FUEL CELL SEPARATOR HAVING EXCELLENT THROUGH-PLANE ELECTRICAL CONDUCTIVITY AND CORROSION RESISTANCE AND METHOD FOR MANUFACTURING SAME

(71) Applicant: POSCO Co., Ltd, Pohang-si (KR)

(72) Inventors: Jonghee Kim, Daejeon (KR); Jinsuk Kim, Pohang-si (KR); Bosung Seo, Pohang-si (KR); Kwangmin Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 619 days.

(21) Appl. No.: 18/265,879

(22) PCT Filed: Dec. 8, 2021

(86) PCT No.: PCT/KR2021/018522
§ 371 (c)(1),
(2) Date: Jun. 7, 2023

(87) PCT Pub. No.: WO2022/124788
PCT Pub. Date: Jun. 16, 2022

(65) Prior Publication Data

US 2024/0030465 A1 Jan. 25, 2024

(30) Foreign Application Priority Data

Dec. 8, 2020 (KR) ........................ 10-2020-0170587
Nov. 24, 2021 (KR) ........................ 10-2021-0163131

(51) Int. Cl.
*H01M 8/021* (2016.01)
*H01M 8/0228* (2016.01)

(52) U.S. Cl.
CPC ......... *H01M 8/021* (2013.01); *H01M 8/0228* (2013.01)

(58) Field of Classification Search
None
See application file for complete search history.

(56) References Cited

U.S. PATENT DOCUMENTS 12,049,688 B2 * 7/2024 Kim ........................ C23C 22/34
2004/0253503 A1 12/2004 Ohtani et al.
(Continued)

FOREIGN PATENT DOCUMENTS

CN 102471916 A 5/2012
CN 107251294 A 10/2017
(Continued)

OTHER PUBLICATIONS

The Extended European Search Report dated Dec. 20, 2024 issued in European Patent Application No. 21903834.6.
(Continued)

*Primary Examiner* — Kevin M Bernatz
(74) *Attorney, Agent, or Firm* — Morgan Lewis & Bockius LLP

(57) ABSTRACT

A stainless steel for a fuel cell separator with excellent through-plane electrical conductivity and corrosion resistance, when the surface of stainless steel containing 15% or more of Cr by weight is measured by X-ray angle-resolved photoelectron spectroscopy using an Al-Kα X-ray source under the condition that the photoelectron take-off angle is 12°, following surface oxide element ratio (1) value may be 0.5 to 5, and following surface oxide element ratio (2) value may be 0.5 or less:
(Continued)

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}}. \quad (2)$$

4 Claims, 5 Drawing Sheets

(56) References Cited

U.S. PATENT DOCUMENTS

| | | | | |
|---|---|---|---|---|
| 2006/0105218 | A1 | 5/2006 | Fukuda et al. | |
| 2011/0294042 | A1 | 12/2011 | Kim et al. | |
| 2012/0276472 | A1 | 11/2012 | Ishii et al. | |
| 2012/0308917 | A1 | 12/2012 | Abd Elhamid et al. | |
| 2016/0160329 | A1 * | 6/2016 | Kim | C22C 38/50<br>420/60 |
| 2018/0034069 | A1 | 2/2018 | Tarutani et al. | |
| 2018/0219201 | A1 * | 8/2018 | Kim | C25F 5/00 |
| 2019/0296369 | A1 | 9/2019 | Yano et al. | |
| 2023/0043454 | A1 * | 2/2023 | Kim | C22C 38/004 |
| 2023/0066817 | A1 * | 3/2023 | Kim | C22C 38/004 |
| 2023/0420697 | A1 * | 12/2023 | Kim | C22C 38/22 |

FOREIGN PATENT DOCUMENTS

| | | | |
|---|---|---|---|
| CN | 109312422 | A | 2/2019 |
| JP | 2002-075399 | A | 3/2002 |
| JP | 2004-149920 | A | 5/2004 |
| JP | 4133323 | B2 | 8/2008 |
| JP | 2008-285731 | A | 11/2008 |
| JP | 2009-263794 | A | 11/2009 |
| JP | 2010-138487 | A | 6/2010 |
| JP | 2013-065562 | A | 4/2013 |
| JP | 2018-534416 | A | 11/2018 |
| JP | 6418364 | B1 | 11/2018 |
| JP | 2019-178412 | A | 10/2019 |
| JP | 2020-164929 | A | 10/2020 |
| KR | 10-2010-0080379 | A | 7/2010 |
| KR | 10-2013-0074216 | A | 7/2013 |
| KR | 10-2014-0081161 | A | 7/2014 |
| KR | 10-2014-0082506 | A | 7/2014 |
| KR | 10-2015-0074768 | A | 7/2015 |
| KR | 10-2017-0035374 | A | 3/2017 |
| KR | 10-2068479 | B1 | 1/2020 |
| WO | 2021/125534 | A1 | 6/2021 |

OTHER PUBLICATIONS

Indonesian Office Action dated Sep. 10, 2025 issued in Indonesian Patent Application No. P00202305089 (with English translation).

Japanese Office Action dated Jul. 2, 2024 issued in Japanese Patent Application No. 2023-535010 (with English translation).

International Search Report dated Mar. 23, 2022 issued in International Patent Application No. PCT/KR2021/018522 (with English translation).

Office Action dated Feb. 13, 2026 issued in the corresponding Korean Patent Application No. 10-2021-0163131 with the English translation.

Office Action dated Feb. 10, 2026 issued in the corresponding Indian Patent Application No. 202317039088 with the English translation. (Note: US2016160329A1 already submitted.).

Office Action dated Jun. 18, 2026 issued in the corresponding Chinese Patent Application No. 202180089547.1 with the English translation.

* cited by examiner

【FIG 1】
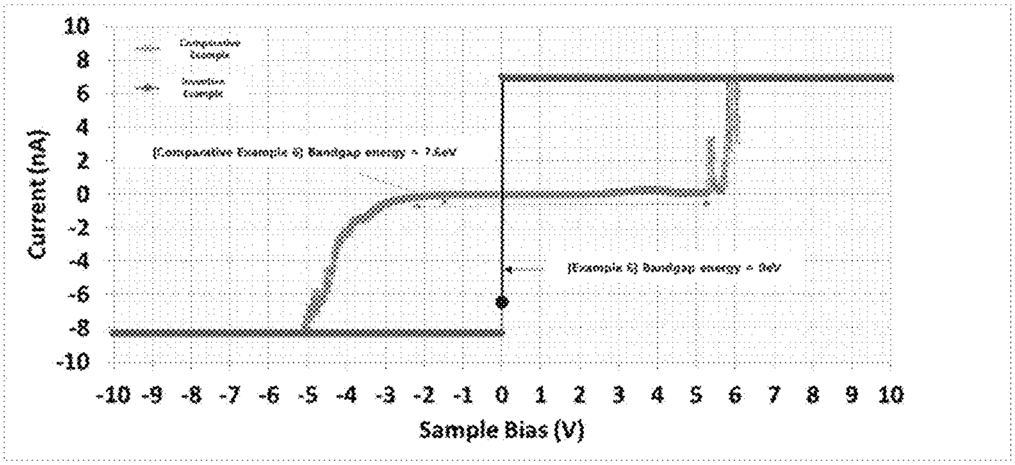

【FIG 2】
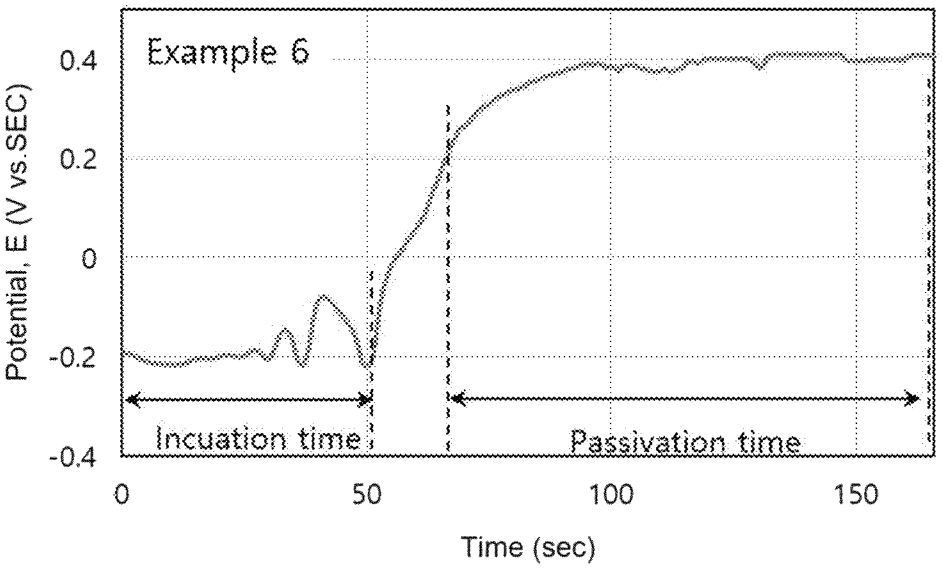

【FIG 3】
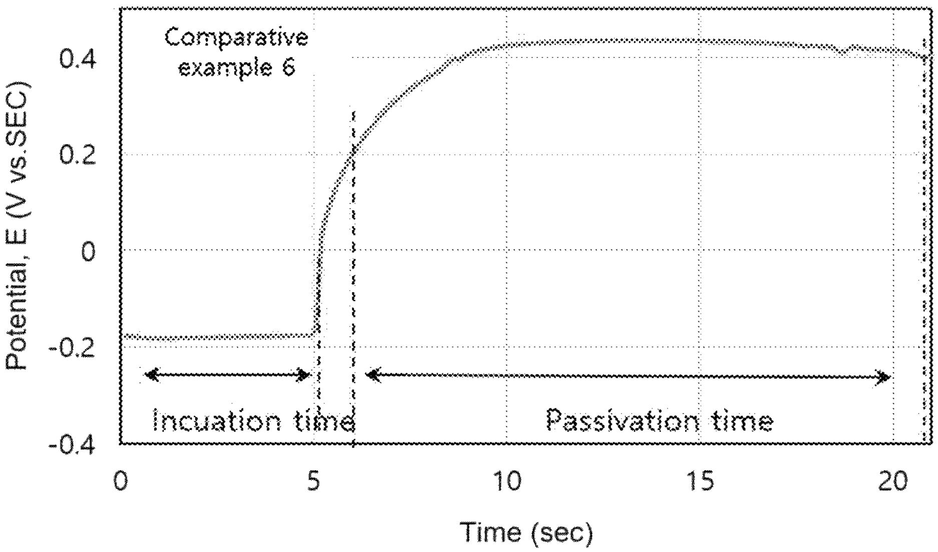

【FIG 4】
[Example 6]
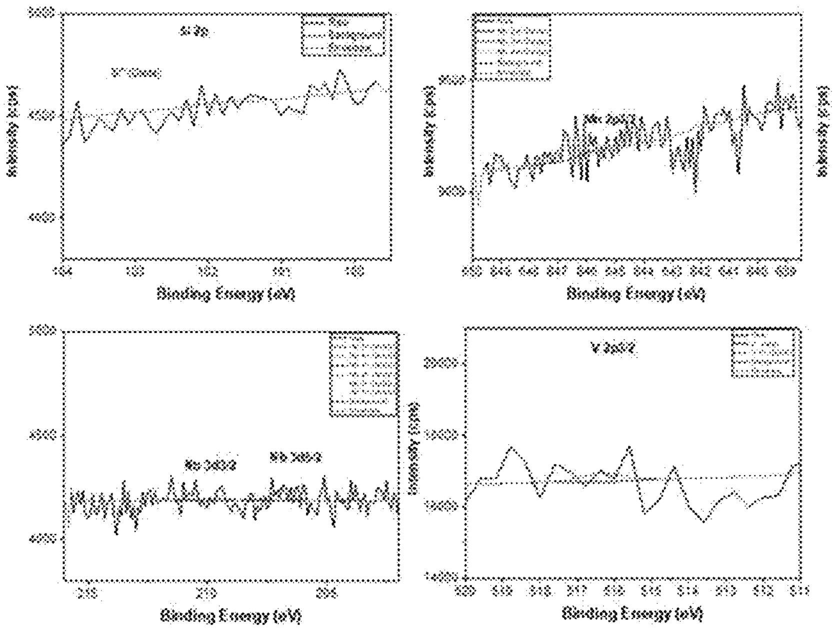

【FIG 5】
[Comparative example 6]
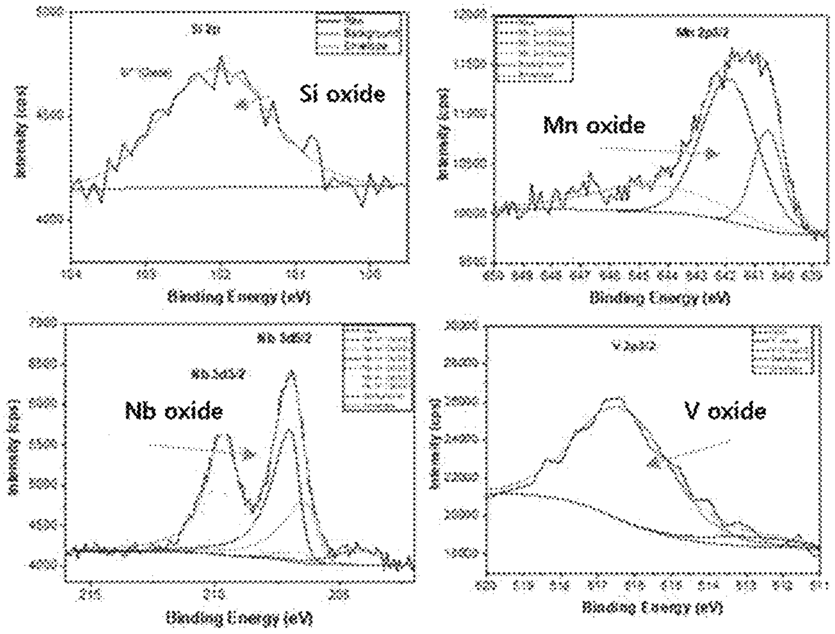

STAINLESS STEEL FOR FUEL CELL SEPARATOR HAVING EXCELLENT THROUGH-PLANE ELECTRICAL CONDUCTIVITY AND CORROSION RESISTANCE AND METHOD FOR MANUFACTURING SAME

CROSS-REFERENCE OF RELATED APPLICATIONS

This application is the U.S. National Phase under 35 U.S.C. § 371 of International Patent Application No. PCT/KR2021/018522, filed on Aug. 12, 2021 which claims priority to and the benefit of Korean Application Nos. 10-2020-0170587 filed on Dec. 8, 2020 and 10-2021-0163131 filed on Nov. 24, 2021, the entire contents of which are incorporated herein by reference.

TECHNICAL FIELD

The present invention relates to stainless steel with excellent through-plane electrical conductivity and corrosion resistance and a method for manufacturing the same, and more particularly, to a stainless steel for a fuel cell separator having excellent through-plane electrical conductivity and corrosion resistance and a method for manufacturing the same.

BACKGROUND ART

Stainless steel has excellent corrosion resistance and is easy to process, so it is being reviewed as a material for electronic parts and a material for a fuel cell separator. However, conventional stainless steel has a problem in that the passivation film on the surface acts as a through-plane resistance element and does not secure sufficient electrical conductivity.

Until now, the mechanism of the passivation film's effect on the through-plane electrical conductivity of stainless steel has not been clearly identified. In order to improve the electrical conductivity through the surface of the passivation film, Ni plating is applied in the case of materials for electronic parts, or conductive materials such as gold, carbon, and nitrides are used to lower the high contact resistance value of stainless steel in the case of a fuel cell separator. A process for coating the surface of stainless steel has been proposed. However, there is a problem in that productivity decreases due to an increase in manufacturing cost and manufacturing time due to an additional process for coating Ni plating or other coating materials, and that the fundamental through-plane resistance of the passivation film cannot be lowered.

In addition, a method of modifying the surface of stainless steel has been attempted as another method for improving the through-plane electrical conductivity of stainless steel.

Patent Document 1 proposes a stainless steel for a separator having low interfacial contact resistance and high corrosion potential by controlling a surface modification process.

Patent Document 2 proposes a method for producing stainless steel having excellent corrosion resistance and low contact resistance by immersing stainless steel containing 17 to 23% by weight of Cr in $[HF]\geq[HNO_3]$ solution.

Patent Document 3 proposes a stainless steel having 1 or more of the ratio of the number of Cr atoms/Fe atoms contained in a passivation film of stainless steel containing 15 to 45% of Cr by weight and 0.1 to 5% of Mo by weight.

However, Patent Documents 1 to 3 have limitations in that the fundamental through-plane resistance of the passivation film of stainless steel cannot be lowered by adjusting the ratio of the number of Cr atoms/Fe atoms in the passivation film in the region of several nm.

DISCLOSURE

Technical Problem

In order to solve the above problems, the present invention is to provide a stainless steel for a fuel cell separator having excellent through-plane electrical conductivity, and corrosion resistance applicable as a material for a fuel cell separator and a method for manufacturing the same.

Technical Solution

As a mean for achieving the above object, stainless steel having excellent through-plane electrical conductivity and corrosion resistance according to an example of the present invention is obtained by examining the surface of stainless steel containing 15% or more of Cr by weight by X-ray angle resolution photoelectron spectroscopy to Al— K When the photoelectron take-off angle is measured using an a X-ray source under the condition of 12°, the measured surface oxide element ratio (1) value may be 0.5 to 5, and the surface oxide element ratio (2) value may be 0.5 or less.

A stainless steel for a fuel cell separator with excellent through-plane electrical conductivity and corrosion resistance, when the surface of stainless steel containing 15% or more of Cr by weight is measured by X-ray angle-resolved photoelectron spectroscopy using an Al-Kα X-ray source under the condition that the photoelectron take-off angle is 12°, following surface oxide element ratio (1) value is 0.5 to 5, and following surface oxide element ratio (2) value is 0.5 or less:

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}} \quad (2)$$

wherein Cr oxides mean $Cr_3O_4$, $Cr_2O_3$, $CrO_2$ or $CrO_3$, Cr hydroxides mean CrOOH, $Cr(OH)_2$ or $Cr(OH)_3$, and Fe oxides mean FeO, $Fe_2O_3$ or $Fe_3O_4$, and Fe hydroxides mean FeOOH, wherein the total oxides and hydroxides comprise the Cr oxides, the Cr hydroxides, the Fe oxides, the Fe hydroxides, and metal oxides (MO), and the metal oxides (MO) comprise mixed oxides, and M is Ti, Nb, Mn, Si, V or a combination thereof excluding Cr and Fe, and O means oxygen.

In the stainless steel for a fuel cell separator having excellent through-plane electrical conductivity and corrosion resistance of the present invention, bandgap energy of the surface oxide layer of the stainless steel is 2 eV or less.

In the stainless steel for a fuel cell separator having excellent through-plane electrical conductivity and corrosion resistance, the surface oxide layer of the stainless steel forms an ohmic contact with the base material.

In the stainless steel for a fuel cell separator having excellent through-plane electrical conductivity and corrosion resistance, the surface passivation potential of the stainless steel is 0.2V or more.

Incubation step of surface-modifying the cold-rolled stainless steel plate using an acid solution for a processing time satisfying the following formula (1); and It may comprise a passivation step of surface modification during the processing time that satisfies the following formula (2).

$$\text{Incubation process time (sec)} \geq 3\times[\text{Mn}]+15\times[\text{Si+Ti}]+10\times[\text{Nb+V}]-0.05\times[\text{Cr}] \quad (1)$$

$$\text{Passivation process time (sec)} \geq 0.8\times[\text{Cr}] \quad (2)$$

Mn, Si, Ti, Nb, V, and Cr in the above formula are weight % values.

In the method for manufacturing stainless steel for a fuel cell separator having excellent through-plane electrical conductivity and corrosion resistance according to an example of the present invention, the acid solution may comprise at least one of sulfuric acid, nitric acid, hydrochloric acid, ammonium fluoride, hydrogen peroxide, and citric acid.

Advantageous Effects

The present invention can provide a stainless steel for a fuel cell separator having excellent through-plane electrical conductivity and corrosion resistance applicable to a material for a fuel cell separator by conducting a surface oxide layer having semiconductor characteristics formed on the surface of stainless steel and a method for manufacturing the same.

DESCRIPTION OF DRAWINGS

FIG. 1 is a result of comparing the bandgap energy of the surface oxide layer for Example 6 and Comparative Example 6.

FIG. 2 is a diagram showing the incubation process time and the passivation process time for Example 6, and the passivation process time is the time at which the potential rises and the potential is maintained from the point when the surface potential becomes 0.2V (vs. Saturated Calomel Electrode) or more.

FIG. 3 is a diagram showing the incubation process time and the passivation process time for Comparative Example 6.

FIG. 4 is an observation result of Si, Mn, Nb, and V oxides observed when the surface of Example 6 is measured by X-ray angle-resolved photoelectron spectroscopy using an Al-Kα X-ray source under the condition that the take-off angle of photoelectrons is 12°.

FIG. 5 is an observation result of Si, Mn, Nb, and V oxides observed when the surface of Comparative Example 6 is measured by X-ray angle-resolved photoelectron spectroscopy using an Al-Kα X-ray source under the condition that the take-off angle of photoelectrons is 12°.

BEST MODE

As a mean for achieving the above object, a stainless steel for a fuel cell separator with excellent through-plane electrical conductivity and corrosion resistance according to an example of the present invention, when the surface of stainless steel containing 15% or more of Cr by weight is measured by X-ray angle-resolved photoelectron spectroscopy using an Al-Kα X-ray source under the condition that the photoelectron take-off angle is 12°, following surface oxide element ratio (1) value may be 0.5 to 5, and following surface oxide element ratio (2) value may be 0.5 or less:

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}} \quad (2)$$

wherein Cr oxides mean $Cr_3O_4$, $Cr_2O_3$, $CrO_2$ or $CrO_3$, Cr hydroxides mean CrOOH, $Cr(OH)_2$ or $Cr(OH)_3$, and Fe oxides mean FeO, $Fe_2O_3$ or $Fe_3O_4$, and Fe hydroxides mean FeOOH, wherein the total oxides and hydroxides comprise the Cr oxides, the Cr hydroxides, the Fe oxides, the Fe hydroxides, and metal oxides (MO), and the metal oxides (MO) comprise mixed oxides, and M is Ti, Nb, Mn, Si, V or a combination thereof excluding Cr and Fe, and O means oxygen.

MODES OF THE INVENTION

A stainless steel for a fuel cell separator with excellent through-plane electrical conductivity and corrosion resistance according to an example of the present invention, when the surface of stainless steel containing 15% or more of Cr by weight is measured by X-ray angle-resolved photoelectron spectroscopy using an Al-Kα X-ray source under the condition that the photoelectron take-off angle is 12°, following surface oxide element ratio (1) value may be 0.5 to 5, and following surface oxide element ratio (2) value may be 0.5 or less:

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}} \quad (2)$$

wherein Cr oxides mean $Cr_3O_4$, $Cr_2O_3$, $CrO_2$ or $CrO_3$, Cr hydroxides mean CrOOH, $Cr(OH)_2$ or $Cr(OH)_3$, and Fe oxides mean FeO, $Fe_2O_3$ or $Fe_3O_4$, and Fe hydroxides mean FeOOH, wherein the total oxides and hydroxides comprise the Cr oxides, the Cr hydroxides, the Fe oxides, the Fe hydroxides, and metal oxides (MO), and the metal oxides (MO) comprise mixed oxides, and M is Ti, Nb, Mn, Si, V or a combination thereof excluding Cr and Fe, and O means oxygen.

In the stainless steel for a fuel cell separator having excellent through-plane electrical conductivity and corrosion resistance of the present invention, wherein bandgap energy of the surface oxide layer of the stainless steel may be 2 eV or less.

In the stainless steel for a fuel cell separator having excellent through-plane electrical conductivity and corrosion resistance of the present invention, wherein surface oxide layer of the stainless steel may form an ohmic contact with the base metal.

In the stainless steel for a fuel cell separator having excellent through-plane electrical conductivity and corrosion resistance of the present invention, wherein surface passivation potential of the stainless steel may be 0.2V or more.

Preferred examples of the present invention are described below. However, the examples of the present invention can be modified in many different forms, and the technical ideas of the present invention is not limited to the examples described below. In addition, the examples of the present invention are provided to more completely explain the present invention to those skilled in the art.

Terms used in this application are only used to describe specific examples. Therefore, for example, expressions in the singular number comprise plural expressions unless the context clearly requires them to be singular. In addition, the terms "comprise" or "have" used in this application are used to clearly indicate that the features, steps, functions, components, or combinations thereof described in the specification exist, but other features It should be noted that it is not intended to be used to preliminarily exclude the presence of any steps, functions, components, or combinations thereof.

Meanwhile, unless otherwise defined, all terms used in this specification should be regarded as having the same meaning as commonly understood by a person of ordinary skill in the art to which the present invention belongs. Accordingly, certain terms should not be interpreted in an overly ideal or formal sense unless clearly defined herein. For example, in this specification, a singular expression comprises a plurality of expressions unless there is a clear exception from the context.

In addition, "about," "substantially," and the like in this specification are used to mean at or near the figures when manufacturing and material tolerances inherent in the stated meanings are presented, and to prevent unscrupulous infringers from taking unfair advantage of the disclosure where precise or absolute figures are stated to aid in understanding the invention.

In addition, in the present specification, "cold-rolled stainless steel plate" refers to a stainless steel cold-rolled steel plate manufactured according to hot rolling-heating-cold rolling-annealing, which is a typical stainless steel manufacturing process, and will be readily recognized by those skilled in the art. To the extent possible, it can be interpreted as a stainless cold-rolled steel plate manufactured according to a conventional cold-rolled stainless steel plate manufacturing process.

In addition, in the present specification, "surface oxide" means an oxide formed on the surface of stainless steel by spontaneous oxidation of a base metal element by external oxygen when stainless steel is exposed to a temperature of about 200° C. or lower. The surface oxide is mainly composed of $Cr_2O_3$, $SiO_2$, SiO, $Si_2O_3$, MnO, $MnO_2$, $Mn_2O_3$, VO, $V_2O_3$, $V_2O_5$, NbO, $NbO_2$, $Nb_2O_5$, $TiO_2$, FeO, $Fe_2O_3$, $Fe_3O_4$ and the like may be comprised as examples. Although examples of surface oxides have been listed above, it should be noted that these are examples to help understand the present invention and do not particularly limit the technical ideas of the present invention.

In addition, in this specification, "surface oxide layer" means a layer containing the surface oxide of the present invention, and can be interpreted as a passivation film of stainless steel.

In addition, as used in this specification, "Fe oxide" means any Fe oxide in the form of an oxide, such as FeO, $Fe_2O_3$, $Fe_3O_4$, and the like, to the extent that it would be recognized to a person of ordinary skill in the art. "Fe hydroxide" means any Fe hydroxide in the form of a hydroxide, such as FeOOH, $Fe(OH)_2$—, $Fe(OH)_3$, and the like, to the extent that it would be recognized to a person of ordinary skill in the art.

In addition, as used in this specification, "Cr oxide" means any Cr oxide in the form of an oxide, such as $Cr_3O_4$, $Cr_2O_3$, $CrO_2$, $CrO_3$, and the like, to the extent that it would be recognized by a person of ordinary skill in the art. "Cr hydroxide" means any Cr hydroxide in the form of a hydroxide, such as CrOOH, $Cr(OH)_2$, $Cr(OH)_3$, etc., to the extent that it would be recognized by a person of ordinary skill in the art.

It is known that the passivation film of a conventional stainless steel has a surface oxide comprising $Cr_2O_3$ as the main component and $SiO_2$, SiO, $Si_2O_3$, MnO, $MnO_2$, $Mn_2O_3$, VO, $V_2O_3$, $V_2O_5$, NbO, $NbO_2$, $Nb_2O_5$, $TiO_2$, FeO, $Fe_2O_3$, $Fe_3O_4$, etc. and has a high resistance due to the semiconductor properties of these oxides. The inventors of the present invention have found a stainless steel for a fuel cell separator having excellent through-plane electrical conductivity and corrosion resistance applicable to materials for a fuel cell separator applications by controlling the element ratio of the surface oxide layer of the stainless steel so that the bandgap energy of the surface oxide layer is controlled below 2 eV and the surface corrosion potential is controlled above 0.2V on the basis of a saturated calomel electrode, thereby conducting the surface oxide layer and providing excellent surface corrosion resistance.

According to one example of the present invention, a stainless steel for a fuel cell separator with excellent through-plane electrical conductivity and corrosion resistance according to one example of the present invention, when the surface of stainless steel containing 15% or more of Cr by weight is measured by X-ray angle-resolved photoelectron spectroscopy using an Al-Kα X-ray source under the condition that the photoelectron take-off angle is 12°, following surface oxide element ratio (1) value may be 0.5 to 5, and following surface oxide element ratio (2) value may be 0.5 or less:

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}} \quad (2)$$

wherein Cr oxides mean $Cr_3O_4$, $Cr_2O_3$, $CrO_2$ or $CrO_3$, Cr hydroxides mean CrOOH, $Cr(OH)_2$ or $Cr(OH)_3$, and Fe oxides mean FeO, $Fe_2O_3$ or $Fe_3O_4$, and Fe hydroxides mean FeOOH, wherein the total oxides and hydroxides comprise the Cr oxides, the Cr hydroxides, the Fe oxides, the Fe hydroxides, and metal oxides (MO), and the metal oxides (MO) comprise mixed oxides, and M is Ti, Nb, Mn, Si, V or a combination thereof excluding Cr and Fe, and O means oxygen.

Although examples of metal oxides (MO) have been listed above, it should be noted that they are illustrative of the present invention and are not intended to be particularly limiting to the technical ideas of the present invention.

Total oxide, hydroxide comprise Cr oxide, Cr hydroxide, Fe oxide, Fe hydroxide, and metal oxide (MO).

In the following, we will explain why we have limited the range of takeoff angles for photoelectrons in X-ray angle-resolved photoelectron spectroscopy, and then we will explain why we have limited the range of values for the surface oxide element ratio (1) and (2).

In X-ray angle-resolved photoelectron spectroscopy, the lower the takeoff angle of the photoelectron, the smaller the depth of analysis in the depth direction from the top surface of the stainless steel, and the larger the takeoff angle, the more the depth of analysis. In view of this, in order to analyze the composition of oxides formed on a nm-thick surface of stainless steel according to the present invention, the surface of stainless steel was measured by X-ray angle-resolved photoelectron spectroscopy using an Al-Kα X-ray source with a take-off angle of 12°.

The reason for limiting the surface oxide element ratio (1) value measured under the above conditions to 0.5 or less is that this is the threshold at which the passivation film transitions from semiconductor to conductor properties. If the surface oxide element ratio (1) value is more than 0.5, the passivation film is not suitable as a stainless steel for a fuel cell separator because the passivation film cannot achieve sufficient through-plane electrical conductivity due to its semiconductor properties.

The reason why the value of the surface oxide element ratio (1) is limited to 0.5 to 5 is that if the value is less than 0.5, the Fe element, which is unfavorable to corrosion resistance, becomes an oxide form deposited in the Cr, and the surface potential of the material becomes less than 0.2V, which may cause a large amount of Fe elution in the fuel cell operating environment and reduce the cell performance. If the value of (1) is more than 5, the Cr content in the surface oxide becomes relatively high, which hinders the ohmic contact due to the uneven contact between the oxide layer and the base material interface layer, which acts as a factor that deteriorates the conductivity and creates a semiconductor characteristic with a bandgap energy of more than 2 eV, resulting in poor electrical conductivity. In view of the surface through-plane electrical conductivity and corrosion resistance, it is preferable to control the oxide layer so that it is more preferably 0.7 to 4.

The reason for limiting the surface oxide element ratio (2) value measured under the above conditions to 0.5 or less is that this is the threshold at which the passivation film transitions from semiconducting to conducting properties. If the surface oxide element ratio (2) value is more than 0.5, the passivation film is not suitable as a stainless steel for a fuel cell separator because the passivation film cannot achieve sufficient through-plane electrical conductivity due to its semiconductor properties.

By controlling the value of the surface oxide element ratio (2) to be 0.5 or less as described above, the present invention can control the bandgap energy of the surface oxide layer to be 2 eV or less. When the bandgap energy is 0 eV, the surface oxide layer has conductor properties, and when the bandgap energy is more than 0 eV and 2 eV or less, the surface oxide layer has intermediate properties between conductor and semiconductor properties, and is therefore suitable for use as a stainless steel for a fuel cell separator.

In addition, according to the present invention, it is more preferable to control the value of the surface oxide element ratio (1) to be 0.44 or less so that the surface oxide layer has a bandgap energy of 0 eV. The bandgap energy of the surface oxide layer of 0 eV means that the stainless steel base metal and the surface oxide layer have formed a new, previously unknown ohmic contact, despite the passive film layer consisting of oxide. In other words, the surface oxide layer has become a new conductive film layer that can form an ohmic contact with the stainless steel base material.

The stainless steel for a fuel cell separator having excellent through-plane electrical conductivity and corrosion resistance according to the present invention has a bandgap energy of the surface oxide layer of 2 eV or less, a surface corrosion potential of 0.2V is sufficient, and there are no special restrictions on the steel type. According to one example, austenitic, ferritic, and ferritic-austenitic two-phase stainless steels can be used as the stainless steels of the present invention.

In addition, the composition of the stainless steel for a fuel cell separator having excellent through-plane electrical conductivity and corrosion resistance according to the present invention is not particularly limited. However, a preferred composition is shown below. However, it should be noted that the following composition is only an example for the purpose of illustrating the present invention and is not intended to limit the technical ideas of the present invention.

In the steel plate according to an example, by weight %, C: more than 0% and less than 0.02%, N: more than 0% and less than 0.02%, Si: more than 0% and less than 0.25%, Mn: more than 0% and less than 0.2%, P: more than 0% and 0.04% or less, S: more than 0% and less than 0.02%, Cr: 15 to 34%, the remainder Fe and other unavoidable impurities. Hereinafter, unless otherwise specified, a unit is weight % (wt %).

C: More than 0% and 0.02% or less, N: More than 0% and 0.02% or less

C and N combine with Cr in steel to form stable Cr carbonitrides. As a result, a region where Cr is locally deficient is formed and corrosion resistance may deteriorate. Therefore, the lower the content of both elements, the more preferably. Accordingly, in the present invention, the content of C and N may be added to C: more than 0% and 0.02% or less, N: more than 0% and 0.02% or less.

Si: more than 0% and 0.25% or less

Si is an element effective for deoxidation. However, when excessively added, toughness and formability are deteriorated, and $SiO_2$ oxide generated during annealing process deteriorates electrical conductivity and hydrophilicity. In consideration of this, in the present invention, the content of Si may be added to more than 0% and 0.25% or less.

Mn: more than 0% and 0.2% or less

Mn is an element effective for deoxidation. However, since MnS, which is an inclusion of Mn, reduces corrosion resistance, the content of Mn in the present invention may be added to more than 0% and less than 0.2%.

P: more than 0% and 0.04% or less

Since P lowers corrosion resistance as well as toughness, in the present invention, the content of P may be added to more than 0% and 0.04% or less.

S: More than 0% and 0.02% or less

S is combined with Mn in steel to form stable MnS, and the formed MnS becomes a starting point for corrosion and deteriorates corrosion resistance, so the lower the S content, the more preferably. In consideration of this, in the present invention, the content of S may be added to more than 0% and 0.02% or less.

Cr: 15 to 34%

Cr is an element that improves corrosion resistance. In order to secure corrosion resistance in a fuel cell operating environment, which is a strong acid environment, Cr is actively added. However, since toughness is reduced when excessively added, the content of Cr in the present invention may be added at 15 to 34% in consideration of this.

In addition to the alloy composition described above, the steel plate according to one example may include, as desired, one or more of the following optional alloying components by weight: V: more than 0% and 0.6% or less, Ti: more than 0% and 0.5% or less, Nb: more than 0% and 0.5% or less.

V: more than 0% and 0.6% or less

V is an element that improves the lifespan characteristics of a fuel cell by suppressing the elution of Fe in the fuel cell operating environment. However, since toughness is reduced when excessively added, the content of V may be added to more than 0% and 0.6% or less in the present invention in consideration of this.

Ti: more than 0% and 0.5% or less, Nb: more than 0% and 0.5% or less

Ti and Nb are elements that combine with C and N in steel to form stable carbonitrides, thereby suppressing the formation of areas where Cr is locally deficient and improving corrosion resistance. However, since the toughness is reduced when added excessively, in consideration of this, the content of Ti and Nb in the present invention may be added to Ti: more than 0% and 0.5% or less, Nb: more than 0% and 0.5% or less.

The remaining component is iron (Fe). However, since unintended impurities from raw materials or the surrounding environment may inevitably be mixed in a conventional manufacturing process, this cannot be excluded. Since the above impurities can be known to anyone skilled in the manufacturing process, not all of them are specifically mentioned in the present specification.

Hereinafter, the present invention will be described in more detail through examples. However, it should be noted that the following examples are only for illustrating the present invention in more detail, and are not intended to limit the scope of the present invention. This is because the scope of the present invention is determined by the matters described in the claims and the matters reasonably inferred therefrom.

EXAMPLE

Steel type having the composition shown in Table 1 below were manufactured into slabs through a steelmaking-casting process. After that, the prepared slab was manufactured into a hot-rolled steel plate having a thickness of 4.5 mm through hot rolling at 1200° C. The hot-rolled steel plate was heated at 1050° C., then cold-rolled and bright annealed repeatedly at 1000° C. in a 100% hydrogen reducing atmosphere to produce a cold-rolled steel plate having a thickness of 0.15 mm.

TABLE 1

| Steel | Alloying element (% by weight) | | | | | | | | | | | | |
|---|---|---|---|---|---|---|---|---|---|---|---|---|---|
| type | C | N | Si | Mn | P | S | Cr | Ni | Cu | V | Mo | Nb | Ti |
| steel 1 | 0.01 | 0.01 | 0.2 | 0.3 | 0.009 | 0.008 | 15.8 | — | — | — | — | — | 0.25 |
| steel 2 | 0.01 | 0.011 | 0.14 | 0.25 | 0.01 | 0.009 | 22 | — | — | — | 0.18 | 0.35 | 0.03 |
| steel 3 | 0.008 | 0.012 | 0.11 | 0.15 | 0.03 | 0.004 | 30.2 | — | — | 0.32 | — | 0.18 | 0.11 |

As shown in Table 2 below, the cold-rolled steel plates prepared in Table 1 are dissolved in 150 g/L sulfuric acid solution, the surface modification step 1 (incubation process) time is adjusted, and hydrogen peroxide is added to the same solution by raising the potential, the second stage of surface modification (passivation process) time was adjusted. The surface oxide element ratios (1) and (2) values in Table 2 are values derived according to the following formulas (1) and (2), and the surfaces of the invention examples and comparative examples were analyzed by X-ray angle resolution photoelectron spectroscopy to Al-Kα It is a value derived when measuring under the conditions of the take-off angle of 12° of photoelectrons listed in Table 2 using an X-ray source.

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

$$\frac{\text{Sum of atomic concentration(at \%) of metal element in the metal oxide}(MO)}{\text{Sum of atomic concentration(at \%) of metal elements in all oxides and hydroxides}} \quad (2)$$

The surface oxide element ratios (1) and (2) values were measured in the following manner. First, it is analyzed by PHI Quantera II equipment, and the analysis result is separated from the peaks at the binding energy of metal oxide (MO), Cr oxide, Cr hydroxide, Fe oxide, and Fe hydroxide using CasaXPS software. Concentration was calculated.

Surface oxide element ratio ‘Sum of atomic concentrations (at %) of metal elements in all oxides and hydroxides’ in the surface oxide element ratio values is calculated by adding the above-mentioned ‘atomic concentrations (at %) of metal elements in metal oxides (MO)’ and the sum of the atomic concentrations (at %) of Cr in Cr oxide and Cr hydroxide, and the sum of atomic concentrations (at %) of Fe in Fe oxides and Fe hydroxides.

The sum of the atomic concentrations (at %) of Cr in Cr oxide and Cr hydroxide was derived by separating the peaks at the binding energies of Cr oxide and Cr hydroxide, and then fitting them to the Cr 2p spectrum to derive the sum of the atomic concentrations (at %) of Cr. The sum of the atomic concentrations (at %) of Fe in Fe oxide and Fe hydroxide was derived by separating the peaks at the binding energy of Fe oxide and Fe hydroxide and fitting them to the Fe 2p spectrum to derive the sum of the atomic concentrations (at %) of Fe. ‘Sum of atomic concentrations (at %) of metal elements in metal oxides (MO)’ was derived by separating the peaks at the binding energy of metal oxides (MO) and fitting them to the spectra of each metal (M) to derive the sum of atomic concentrations (at %) of metal elements. Here, metal oxide (MO) includes mixed oxides, M is an alloying element or combination thereof in the base material except Cr and Fe, and O means oxygen.

The bandgap energies in Table 2 refer to the bandgap energies of the surface oxide layer. Measurements of the bandgap energy of the surface oxide layer were made using a Current Sensing Atomic Force Microscope (Keysight model 9500). The inventive example and comparative example stainless steel were prepared by cutting into 1 cm×1 cm sections, and the bandgap energy was measured in current probe mode with an applied bias of −10V to 10V under a 20 nN load in a nitrogen atmosphere with a relative humidity of 18% so that the surface oxide layer could be measured in an inactive state. The bandgap energy was measured five times on a 50 μm×50 μm area of the specimen, and the width of the region where the current detected is "0" when the applied bias varies from −10V to 10V was measured as the bandgap energy. The probe was a 30 nm thick platinum-coated probe on a silicon probe (Si tip).

In order to secure the surface properties of stainless steel as shown in this example, it is necessary to first remove the MO oxide formed in the surface layer according to the composition of the main alloying elements (Cr, Mn) and re-form the (Cr, Fe) conductive oxide. The process of removing the existing oxide is called the incubation stage, and the process of re-forming the conductive oxide is called the passivation stage.

The time required for the incubation process varies depending on the steel composition, and it can be seen that the more elements such as Mn, Si, Nb, Ti, and V in the steel, the longer the incubation process takes. The higher the Cr content, the higher the surface Cr oxide ratio, which reduces the rate at which these oxides are formed, and therefore the lower the incubation time. Passivation process time can be controlled by changing the total surface treatment time, which can vary with Cr content.

As confirmed by examples, when the incubation process time is greater than the value defined in formula (1), the deformed oxide in the surface layer can be effectively removed, and when the passivation process time is greater than the value defined in formula (2), the bandgap energy of the surface oxide layer is 2 eV or less, and the surface potential is stably secured 0.2V (vs. Saturated Calomel Electrode) or more, excellent conductive and corrosion-resistant oxide can be formed.

$$\text{Incubation process time (sec)} \geq 3\times[\text{Mn}]+15\times[\text{Si+Ti}]+10\times[\text{Nb+V}]-0.05\times[\text{Cr}] \quad (1)$$

$$\text{Passivation process time (sec)} \geq 0.8\times[\text{Cr}] \quad (2)$$

Mn, Si, Ti, Nb, V, and Cr in the above equations are weight % values.

FIG. 1 is a comparison of the bandgap energy of the surface oxide layer for Comparative Example 6 and Example 6.

Comparative Example 6 has a bandgap energy of 7.6 eV for the surface oxide layer, indicating semiconducting properties, while Example 6 has a bandgap energy of 0 eV for the surface oxide layer. The bandgap energy of the surface oxide layer of 0 eV means that the stainless steel base material and the surface oxide layer have formed a new, previously unknown ohmic contact, despite the passive film layer consisting of oxide. In other words, the surface oxide layer has become a new conductive film layer that can form an ohmic contact with the stainless steel base material.

FIG. 2 is an illustration of the Incubation process time and Passivation process time for Example 6, where the Passviation process time is the time from when the surface potential is 0.2V (vs. Saturated Calomel Electrode) or more to when the potential rises and the potential is maintained.

FIG. 3 is an illustration of Incubation process time and Passivation process time for Example 6.

On the other hand, as shown in Example 6, the time required for the incubation process varies depending on the steel composition, and it can be seen that the more elements such as Mn, Si, Nb, Ti, and V in the steel, the longer the incubation process takes. This is because these elements facilitate the formation of surface oxides, which require time to be removed. The Passivation process time can be controlled by changing the total surface treatment time, which is dependent on the Cr content, and it can be seen that the treatment time is longer as shown in Example 6.

FIG. 4 is an observation of Si, Mn, Nb, and V oxides observed when a surface for Example 6 is measured by X-ray angle-resolved photoelectron spectroscopy using an Al-Kα X-ray source with a photoelectron takeoff angle of 12°.

FIG. 5 is an observation of Si, Mn, Nb, and V oxides observed on the surface of Example 6 by X-ray angle-resolved photoelectron spectroscopy when the photoelectron takeoff angle is measured at 12° using an Al-Kα X-ray source.

It can be seen that the metal oxide (MO) observed in Example 6 is lower compared to Comparative Example 6.

TABLE 2

| Classification | Steel type | Incubation process time (sec) | Passivation process time (seconds) | (1) [Sum of atomic concentrations (at %) of element Cr in Cr oxide and Cr hydroxide]/[Sum of atomic concentrations (at %) of element Fe in Fe oxides and Fe hydroxides] | (2) [Sum of atomic concentrations (at %) of metal elements in metal oxides (MO)]/[Sum of atomic concentrations (at %) of metal elements in total oxides and hydroxides] | Surface Bandgap energy of oxide layer (eV) | Corrosion passivation potential (V vs. SCE) |
|---|---|---|---|---|---|---|---|
| Comparative Example 1 | steel 1 | 0 | 5 | 0.4 | 0.7 | 7.5 | 0.12 |
| Comparative Example 2 | steel 1 | 4 | 10 | 0.3 | 0.55 | 3 | 0.31 |
| Comparative Example 3 | steel 1 | 5 | 10 | 0.45 | 0.8 | 4 | 0.16 |
| Comparative Example 4 | steel 2 | 5 | 20 | 0.38 | 0.6 | 3.5 | 0.1 |
| Comparative Example 5 | steel 2 | 5 | 30 | 0.32 | 0.75 | 4.7 | 0.15 |

TABLE 2-continued

| Classification | Steel type | Incubation process time (sec) | Passivation process time (seconds) | (1) [Sum of atomic concentrations (at %) of element Cr in Cr oxide and Cr hydroxide]/[Sum of atomic concentrations (at %) of element Fe in Fe oxides and Fe hydroxides] | (2) [Sum of atomic concentrations (at %) of metal elements in metal oxides (MO)]/[Sum of atomic concentrations (at %) of metal elements in total oxides and hydroxides] | Surface Bandgap energy of oxide layer (eV) | Corrosion passivation potential (V vs. SCE) |
|---|---|---|---|---|---|---|---|
| Comparative Example 6 | steel 3 | 5 | 15 | 6 | 0.78 | 7.6 | 0.42 |
| Comparative Example 7 | steel 3 | 6 | 30 | 6.8 | 0.56 | 3.2 | 0.05 |
| Comparative Example 8 | steel 2 | 6.5 | 13 | 0.4 | 0.68 | 2.8 | 0.11 |
| Comparative Example 9 | steel 3 | 7 | 30 | 6.5 | 0.62 | 2.5 | 0.08 |
| Comparative Example 10 | steel 3 | 7.5 | 15 | 5.4 | 0.78 | 3.8 | 0.09 |
| Comparative Example 11 | steel 2 | 7 | 24 | 0.2 | 0.58 | 5 | 0.12 |
| Comparative Example 12 | steel 1 | 50 | 5 | 0.4 | 0.66 | 3.5 | 0.11 |
| Example 1 | steel 2 | 9 | 18 | 0.5 | 0.25 | 0.2 | 0.25 |
| Example 2 | steel 1 | 7 | 13 | 5 | 0.34 | 0 | 0.4 |
| Example 3 | steel 3 | 16 | 25 | 3.8 | 0.15 | 1.9 | 0.4 |
| Example 4 | steel 1 | 8 | 50 | 4.5 | 0.34 | 1.5 | 0.28 |
| Example 5 | steel 2 | 50 | 100 | 2 | 0.15 | 0 | 0.3 |
| Example 6 | steel 3 | 50 | 100 | 4.4 | 0.1 | 0 | 0.37 |

The above has describes exemplary examples of the present invention, the invention is not limited thereto and one of ordinary skill in the art will understand that various changes and modifications are possible without departing from the concepts and scope of the following claims.

INDUSTRIAL AVAILABILITY

The stainless steel for a fuel cell separator according to the present invention has excellent through-plane electrical conductivity and corrosion resistance, and is therefore industrially available.

The invention claimed is:

1. A stainless steel fuel cell separator, wherein the stainless steel contains at least carbon, 15% or more of Cr by weight, and the balance being Fe and other unavoidable impurities, comprising a surface oxide layer, and when the surface oxide layer of the stainless steel is measured by X-ray angle-resolved photoelectron spectroscopy using an Al-Kα X-ray source under the condition that the photoelectron take-off angle is 12°, the following surface oxide element ratio (1) value is 0.5 to 5, and the following surface oxide element ratio (2) value is 0.5 or less:

$$\frac{\text{Sum of atomic concentrations(at \%) of Cr elements in Cr oxides and Cr hydroxides}}{\text{Sum of atomic concentrations(at \%) of Fe elements in Fe oxides and Fe hydroxides}} \quad (1)$$

-continued $$\frac{\text{Sum of atomic concentration(at \%) of metal element in the metal oxide}(MO)}{\text{Sum of atomic concentration(at \%) of metal elements in all oxides and hydroxides}} \quad (2)$$

wherein Cr oxides mean $Cr_3O_4$, $Cr_2O_3$, $CrO_2$ or $CrO_3$, Cr hydroxides mean CrOOH, $Cr(OH)_2$ or $Cr(OH)_3$, and Fe oxides mean FeO, $Fe_2O_3$ or $Fe_3O_4$, and Fe hydroxides mean FeOOH, wherein the total oxides and hydroxides comprise the Cr oxides, the Cr hydroxides, the Fe oxides, the Fe hydroxides, and metal oxides (MO), and the metal oxides (MO) comprise mixed oxides, and M is Ti, Nb, Mn, Si, V or a combination thereof excluding Cr and Fe, and O means oxygen.

2. The stainless steel fuel cell separator according to claim 1, wherein bandgap energy of the surface oxide layer of the stainless steel is 2 eV or less.

3. The stainless steel fuel cell separator according to claim 1, wherein the surface oxide layer of the stainless steel forms an ohmic contact with the base material.

4. The stainless steel fuel cell separator according to claim 1, wherein surface passivation potential of the stainless steel is 0.2V or more.

* * * * *